(12) United States Patent
Davis

(10) Patent No.: US 8,780,471 B2
(45) Date of Patent: Jul. 15, 2014

(54) LINKING ERRORS TO PARTICULAR TAPES OR PARTICULAR TAPE DRIVES

(75) Inventor: Mark L. Davis, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 13/283,359

(22) Filed: Oct. 27, 2011

(65) Prior Publication Data

US 2013/0107389 A1 May 2, 2013

(51) Int. Cl.
*G11B 27/36* (2006.01)

(52) U.S. Cl.
USPC ............... 360/31; 360/69; 360/71; 360/77.12

(58) Field of Classification Search
None
See application file for complete search history.

(56) References Cited

U.S. PATENT DOCUMENTS

| | | | |
|---|---|---|---|
| 3,704,363 A | 11/1972 | Salmassy et al. | |
| 5,611,044 A | 3/1997 | Lundeby | |
| 7,301,718 B2 * | 11/2007 | Ballard | 360/69 |
| 7,554,759 B2 * | 6/2009 | Gill et al. | 360/69 |
| 7,627,786 B2 * | 12/2009 | Bello et al. | 714/42 |
| 8,149,532 B2 * | 4/2012 | Hood et al. | 360/69 |
| 8,213,102 B2 * | 7/2012 | Leopold et al. | 360/31 |
| 8,339,721 B2 * | 12/2012 | Thompson | 360/31 |
| 2002/0144048 A1 * | 10/2002 | Bolt | 711/4 |
| 2003/0214744 A1 * | 11/2003 | Ishii et al. | 360/60 |
| 2005/0052772 A1 * | 3/2005 | Barbian et al. | 360/69 |
| 2005/0091369 A1 * | 4/2005 | Jones | 709/224 |
| 2005/0246590 A1 * | 11/2005 | Lancaster | 714/47 |
| 2006/0126211 A1 * | 6/2006 | Sasaki | 360/74.4 |
| 2007/0025008 A1 * | 2/2007 | Ballard | 360/69 |
| 2010/0182887 A1 * | 7/2010 | Moody et al. | 369/53.42 |
| 2010/0302667 A1 * | 12/2010 | Fry et al. | 360/31 |
| 2012/0194935 A1 * | 8/2012 | Edling et al. | 360/31 |
| 2012/0198289 A1 * | 8/2012 | Hostetter et al. | 714/54 |
| 2013/0013967 A1 * | 1/2013 | Gokhale et al. | 714/57 |
| 2013/0031427 A1 * | 1/2013 | Itagaki et al. | 714/54 |

FOREIGN PATENT DOCUMENTS

WO WO2009/001412 A1 12/2008

* cited by examiner

*Primary Examiner* — Dismery Mercedes

(57) ABSTRACT

Techniques to determine particular bad tapes or tape drives. All tape and tape drive combinations within a system may be obtained. A read error or a write error that occurs with each tape and tape drive combination may be detected, and the read error, the write error, or a parameter may be analyzed to determine the particular tape or the particular tape drive that is bad.

15 Claims, 5 Drawing Sheets

300

|   | 1 | 2 | 3 | 4 | 5 | 6 | 7 | 8 | 9 |
|---|---|---|---|---|---|---|---|---|---|
| A | Good | Good | Good | Good | Good | Write Error | Good | Good | Good |
| B | Good | Good | Good | Good | Good | Good | Good | Write Error | Good |
| C | Read Error | Good | Read Error, Write Error | Write Error | Read Error | Read Error | Read Error | Good | Write Error |
| D | Good | Write Error | Good | Good | Good | Good | Good | Good | Good |
| E | Good | Good | Good | Good | Good | Good | Good | Good | Good |

LINKING ERRORS TO PARTICULAR TAPES OR PARTICULAR TAPE DRIVES

BACKGROUND

A tape drive is a computer component used to write data to a tape, such as a magnetic tape. The tape drive is typically used to backup data from the computer onto the tape. In the event of a malfunction, data can be restored to the computer system from the tape using the tape drive.

Errors may occur when manipulating data, including reading data from a tape or writing data to a tape. When a read error or a write error occurs, a user may view graphs of write margin data in order to pinpoint the error. Based on the graphs of write margin data, the user can decide what action to take in order to remedy the error. The action may include replacing drives or tapes within the system that the user believes to be the cause of the error. However, the write margin data of most systems is extensive and can easily overwhelm the user. As a result, the user typically engages in a lengthy trial and error process of replacing drives and tapes until the error is resolved, with no clear indication of the faulty tape or tape drive.

BRIEF DESCRIPTION OF THE DRAWINGS

Certain exemplary embodiments are described in the following detailed description and in reference to the drawings, in which:

FIG. 4 is a diagram of a matrix containing information related to each tape and tape drive combination, in accordance with embodiments.

DETAILED DESCRIPTION OF SPECIFIC EMBODIMENTS

When a tape or tape drive corrupts the data that is being manipulated, the tape or tape drive is generally referred to as a bad tape or a bad tape drive, respectively. The particular cause of error may be unknown, because the error may occur as a result of a faulty tape, or the error can be the result of a faulty tape drive.

In embodiments, a data store may be statistically analyzed to identify bad tapes or bad tape drives. In particular, an existing data store can be monitored to determine if any read error or write error follows the use of a specific tape or tape drive. In embodiments, the analysis may include analyzing each tape and tape drive combination, then determining a write margin result for each tape and tape drive combination. Further, in embodiments, the tapes or tape drives that are known to be bad as a result of data store analysis are excluded from the future analysis.

Figure 1:
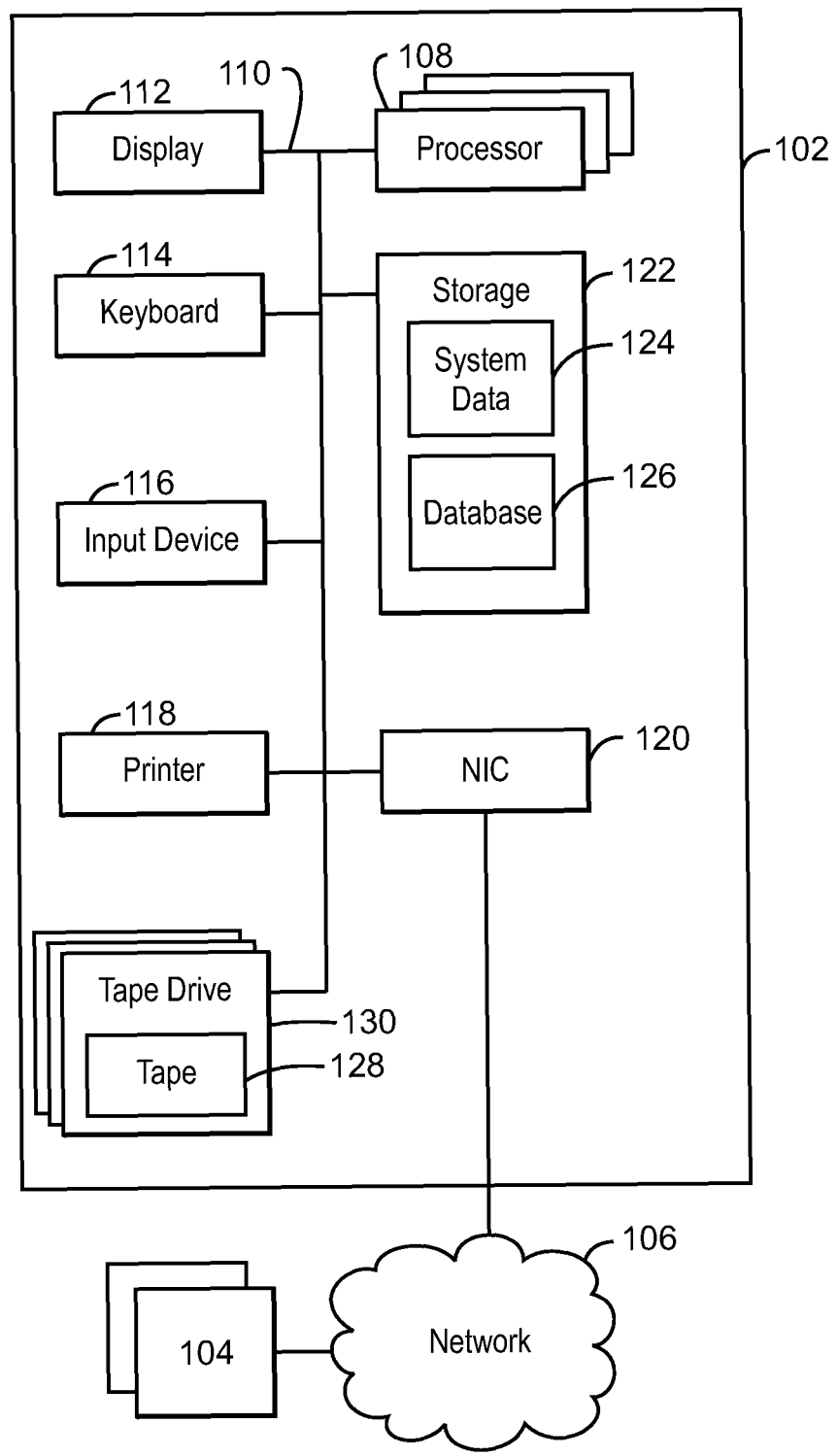
FIG. 1 is a block diagram of a system that may link errors to particular tapes or tape drives, in accordance with embodiments.

FIG. 1 is a block diagram of a system that links errors to particular tapes or tape drives according to an embodiment of the present techniques. The system is generally referred to by the reference number 100. It should be understood that the functional blocks and devices shown in FIG. 1 may comprise hardware elements including circuitry, software elements including computer code stored on a tangible, machine-readable medium, or a combination of both hardware and software elements. Additionally, the functional blocks and devices of the system 100 are but one example of functional blocks and devices that may be implemented in an embodiment. It should be understood that it may be possible to define specific functional blocks based on design considerations for a particular computer system.

The system 100 may include a server 102, and one or more client computers 104, in communication over a network 106. As illustrated in FIG. 1, the server 102 may include one or more processors 108 connected through a bus 110 to a display 112, a keyboard 114, one or more input devices 116, and an output device such as a printer 118, for example. The input devices 116 may include devices such as a mouse or touch screen. In embodiments, the processors 108 include a single core, multiple cores, or a cluster of cores in a cloud computing architecture. The server 102 may be connected through the bus 110 to a network interface card (NIC) 120 that connects the server 102 to the network 106.

The network 106 may be a local area network (LAN), a wide area network (WAN), or another network configuration. The network 106 may include routers, switches, modems, or any other kind of interface device used for interconnection. The network 106 may connect to several client computers 104. Through the network 106, several client computers 104 may connect to the server 102. The client computers 104 may be similarly structured as the server 102.

The server 102 may have other units operatively coupled to the processor 108 through the bus 110. These units can include tangible, machine-readable storage media, such as storage 122. The storage 122 can include any combinations of hard drives, read-only memory (ROM), random access memory (RAM), RAM drives, flash drives, optical drives, cache memory, and the like. Storage 122 can include system data 124 and a data store 126. The system data 124 can include any data that is obtained from various system components or programs, such as user data files, software applications, and the like. In embodiments, the data store 126 is used to store parameters related to tapes 128 and tape drives 130. As illustrated in FIG. 1, the server 102 can include or be operatively coupled to one or more tapes 128 and tape drives 130.

A backup copy of data within the storage 122, such as the system data 124, can be created on the tapes 128 using the tape drives 130. The process of copying data to the tapes 128 may be automated such that new tapes are automatically loaded to the tape drives. When a read error or a write error occurs within the tapes 128 or tape drives 130, the data in data store 126 can be statistically analyzed in order to determine the particular tape 128 or the particular tape drive 130 that is the cause of the read error or the write error. In other words, in a system with multiple tapes and multiple tape drives, a particular tape or a particular tape drive may be linked to an error as being responsible for the error. Further, the particular tape or tape drive linked to the error may be designated as a bad tape or bad tape drive.

Figure 2:
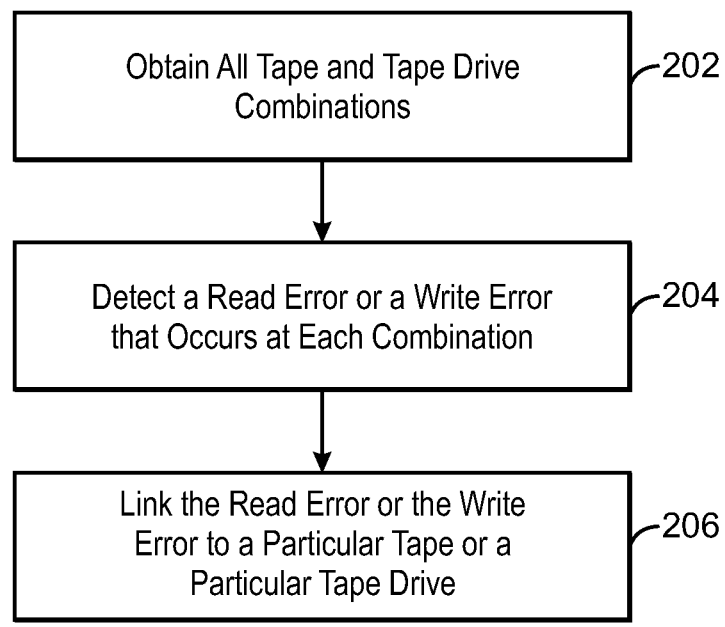
FIG. 2 is a process flow diagram for an overview of a method of linking errors to particular tapes or particular tape drives, in accordance with embodiments.

FIG. 2 is a process flow diagram for an overview of a method 200 of linking errors to particular tapes or particular tape drives according to an embodiment of the present techniques. At block 202, each tape and tape drive combination in the system may be obtained. At block 204, any read error or write error that occurs at each tape and tape drive combination is detected. The read error or write error may be detected using various methods, including but not limited to error correcting code or parity bits.

At block 206, the read error or write error is linked to a particular tape or a particular tape drive. The linking of tapes or tape drives may occur when analyzing the read error or the write error that has been detected at the tape and tape drive combinations. The errors and other parameters may be obtained from drive logs associated with each tape drive, then used to calculate a write margin. The parameters may include, but are not limited to, the age of the data that was written to the tape by the tape drive, the number of megabytes that were written at the particular data point, the amount of data that was written at the particular data point, the amount of data that was re-written at the particular data point, and the write margin of the particular data point. The write margin is an indicator of the number of write attempts performed by the tape drive to successfully write data to the tape. Each of the errors, parameters, and write margin may be obtained from drive logs and stored in a data store, such as data store 126 (FIG. 1). During the analysis, a trend may be discovered in the write margin where a read error or a write error follows the use of a particular tape or a particular tape drive. The read error or the write error may be linked to the particular tapes or particular tape drives that exhibit a trend of erroneous read or write results.

Figure 3:
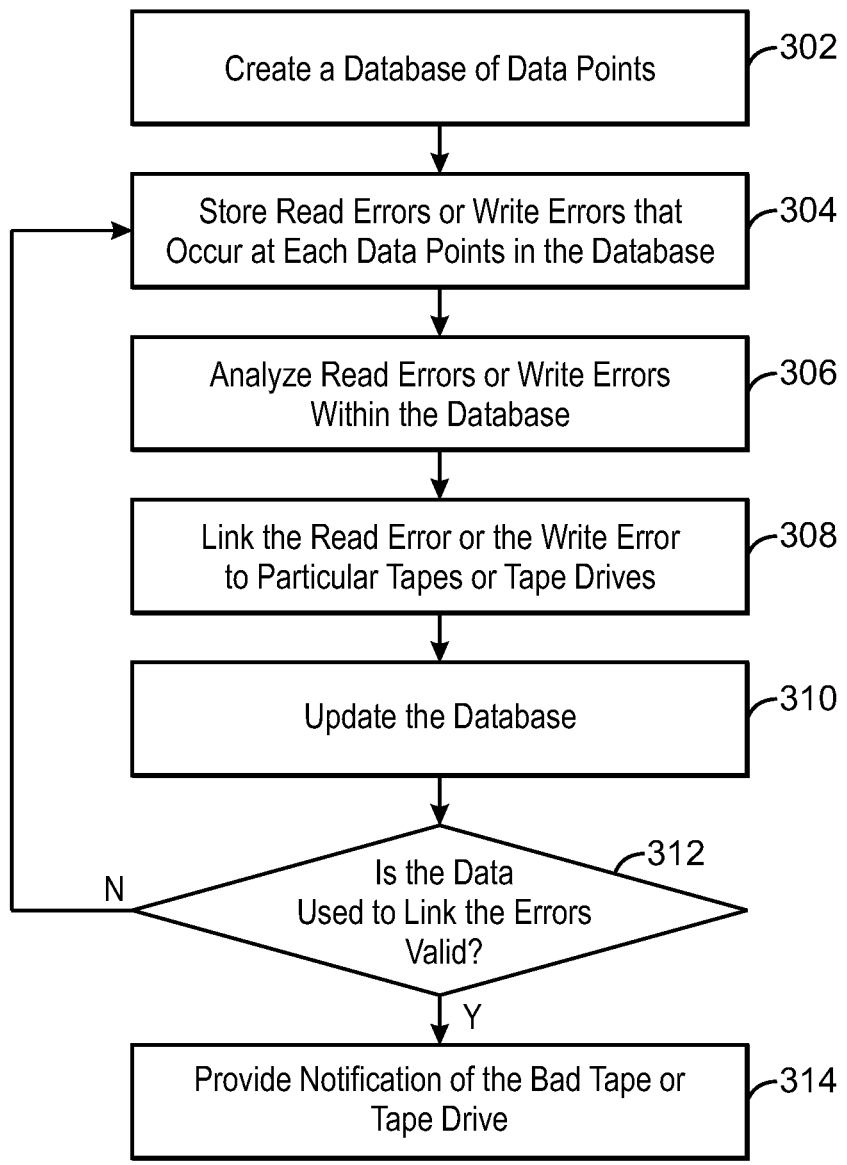
FIG. 3 is a process flow diagram of a method of linking errors to particular tapes or particular tape drives, in accordance with embodiments.

FIG. 3 is a process flow diagram for a method 300 of linking errors to particular tapes or particular tape drives according to an embodiment of the present techniques. At block 302, a group of data points may be created and stored to the data store 126 (FIG. 1). Each data point represents the data collected for a combination of a specific tape and a specific tape drive.

The data at each data point may include the read errors, write errors, and parameters for the corresponding tape and tape drive combination. The parameters can be used to provide insight to the health of the tape or tape drive at a particular data point. The data store may also include a status of each tape and tape drive combination and a confidence parameter that indicates a level of confidence in the validity of data used to designate a particular tape or a particular tape drive as bad. In embodiments, the confidence parameter may be specified by a user, or can be calculated based on the number of data points, or tape and tape drive combinations, that have been analyzed. For example, the confidence parameter may indicate that the drive quality data can be presented to the user when there are at least four tapes worth of data for that drive, within the last thirty loads for that drive. The data store may also include a status for each tape and tape drive combination, such as good, bad, or the specific type of error found at each tape and tape drive combination. In embodiments, the data store is updated each time the status of a tape and tape drive combination changes, when a new tape or tape drive is loaded into the system, when new data related to the tape and tape drive combination becomes available, or when a tape is unloaded from a tape drive. Additionally, the database is updated when a new tape and tape drive combination is added to the system.

At block 304, a read error or a write error that occurs with each data point may be stored to the data store. At block 306, the read error or the write error within the data store at each data point may be analyzed. In embodiments, the data at each data point is analyzed when a tape is unloaded from the tape drive. Alternatively, the data at each data point may be analyzed after a particular amount of time has lapsed.

Each time a drive unloads a tape, the various parameters may be collected and stored to a data structure referred to herein as a ticket. The ticket includes data from one tape and one tape drive. As discussed herein, the data may be added to the data store. An analysis is performed when data in the data store has been loaded or updated. The analysis may be performed using data points containing the tape or tape drive most recently updated. The analysis may not address tapes or tape drives that have no change, or have not been updated. For the data points that have no change or have not been updated, the previous analysis results may be used in the current analysis. Additionally, filtering may be applied to exclude a tape or tape drive from use in the analysis if it has been previously determined to be bad. Excluding the "known bad" tapes or tape drives is a form of two-dimensional analysis, as the data from a good tape or tape drive may be analyzed in order to find out if they are bad, while a second dimension in analysis excludes data from a bad tape or tape drive. Thus, two dimensional analysis allows the process of finding bad tapes or tape drives to be streamlined, as time is not wasted analyzing tapes or tape drives that are known to be bad.

During the analysis, a write margin result may be statistically determined by applying a logarithmic weighting calculation to both the age of the data at the particular data point and the amount of data written at each data point. The age of the data may be expressed in terms of the number of loads that have occurred since the data at the data point under analysis was read from the tape or written to the tape.

For example, for each tape and tape drive combination, thirty unloads of data, or tickets, may be analyzed. Thus, the tickets are no more than thirty loads old. Each ticket is not considered equal in regards to the data it can provide about the tape and tape drive combination, so various weights are applied. With each ticket, there may have been different amounts of data written, and the tickets may be weighted differently according to the amount of data written for each tape and tape drive combination. Additionally, recent tickets may have a higher weight, as more recent tickets can be considered more important than older tickets.

At block 308, the particular tape or particular tape drives are linked to the read error or the write error using the results of the analysis. The particular tapes or tape drives that have been linked to the read errors or write errors may be designated as bad. At block 310, the data store may be updated. The update to the data store may include updating read errors or write errors in the data store, updating the parameters, or designating particular tapes or particular tape drives as bad. At block 312, process flow determines if the data used to link the read error or the write error to a particular tape or tape drive is valid. The data used to link the read error or the write error to a particular tape or tape drive is valid when the confidence parameter indicates a high level of confidence in the validity of the data used to link the read error or the write error. For example, if the confidence parameter specifies that there should be at least thirty data points, or tickets, for each tape and tape drive combination, the data used to link the read error or the write error will be invalid if there are four tickets for the tape and tape drive combination. If the data used to link the read error or the write error to a particular tape or tape drive is not valid, process flow returns to block 304. If the data used to link the read error or the write error to a particular tape or tape drive is valid, process flow continues to block 314.

At block 314, a notification of the bad tape or bad tape drive may be provided. In embodiments, an identifier of the particular tape or the particular tape drive that is bad may be rendered on a display. In embodiments, an identifier of the particular tape or the particular tape drive that is bad may be sent to a user using electronic mail, instant messaging, or any other messaging technique. The notification may provide a specific instruction, such as the instruction to replace drive A. In this manner, a precise identification of the particular tape or the particular tape drive within a system is given. The trial and error method of finding the bad tape or tape drive is avoided, resulting in an economic benefit to a user of the system. The method 300 may be performed iteratively each time an error is detected or a tape or a tape drive is changed within the system.

FIG. 4 is a diagram of a matrix 400 containing information related to each tape and tape drive combination according to an embodiment of the present techniques. The data in matrix 400 may be stored in the data store 126 (FIG. 1) and may correspond to the tapes and tape drives shown in the system 100 of FIG. 1. For example, a system may have five tape drives, designated by the letters A, B, C, D, and E in the column at reference number 402. The system may also have nine tapes, designated by numbers 1-9 in the row at reference number 404. An auto-load feature may be used to allow tapes to be automatically loaded to a tape drive, depending on how data is written among the tapes. Thus, at any point in time, five tapes may be loaded to the five tape drives, while the remaining four tapes are held in a reserve area. The tape drives can unload a tape and automatically load one of the four tapes in reserve depending on how data is written to the tapes. Although data for five tape drives and nine tapes is displayed, any number of tapes and tape drives may be used.

The matrix may include data regarding the status of each tape and tape drive combination, as well as other parameters of each tape and tape drive combination. For the combination of Tape Drive A and Tape 5, no errors have been detected. Thus, the data point representing Tape Drive A and Tape 5 at reference number 406 shows the status of the combination as "Good." Similarly, for the combination of Tape Drive D and Tape 2, a write error has been detected. Thus, the data point representing Tape Drive D and Tape 2 at reference number 408 shows the status of the combination as "Write Error."

Each time a read error or a write error occurs, the matrix may be updated to reflect the detected error. After each update, the errors within the matrix 400 may be analyzed to link a specific tape or tape drive to the errors. For example, through the analysis at block 306 (FIG. 3), Tape Drive C at reference number 410 may be linked to the errors occurring at each tape that has been loaded to Tape Drive C within the system represented by matrix 400. After the errors have been linked to a particular tape or tape drive, the tape or tape drive responsible for the errors may be designated as bad. Additionally, a notification may be sent to a user that identifies the tape or tape drive responsible for the errors if the confidence parameter indicates that the data is valid. For example, the data may not be valid if there are not enough data points within the data store to determine the tape or tape drive responsible for the errors.

Figure 5:
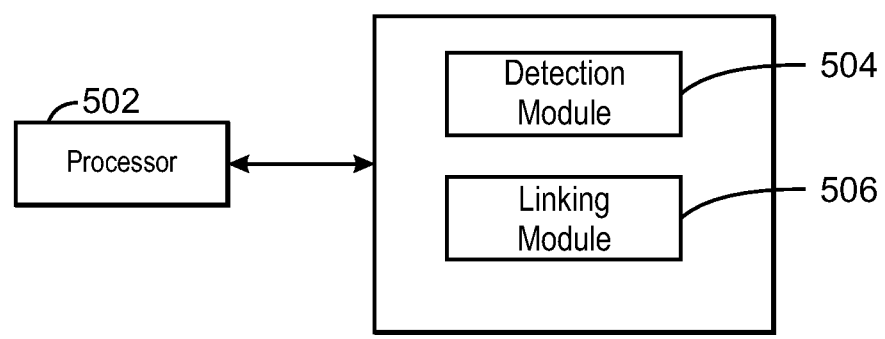
FIG. 5 is a block diagram showing a non-transitory, computer-readable medium that stores code for linking errors to particular tapes or particular tape drives, in accordance with embodiments.

FIG. 5 is a block diagram showing a non-transitory, computer-readable medium that stores code for linking errors to particular tapes or particular tape drives according to an embodiment of the present techniques. The non-transitory, computer-readable medium is generally referred to by the reference number 500.

The non-transitory, computer-readable medium 500 may correspond to any typical storage device that stores computer-implemented instructions, such as programming code or the like. For example, the non-transitory, computer-readable medium 500 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 502 generally retrieves and executes the computer-implemented instructions stored in the non-transitory, computer-readable medium 500 for linking errors to particular tapes or tape drives. At block 504, a detection module may obtain all tape and tape drive combinations, and detect the read errors or write errors that occur with each tape and tape drive combination. At block 506, a linking module may analyze the read errors or write errors, and link the read errors or the write errors to particular tapes or tape drives.

What is claimed is:

1. A system for linking errors to a particular tape or a particular tape drive, the system comprising:
   a processor to execute stored instructions; and
   a memory device to store instructions, the memory device comprising processor-executable code, that when executed by the processor, is to:
      obtain tape and tape drive combinations within the system;
      detect a read error or a write error that occurs with each tape and tape drive combination;
      analyze the read error or the write error by determining a write margin result by applying a logarithmic calculation to the age of data at a particular data point and an amount of data written at each data point, wherein the data includes read errors and write errors, and wherein the data point represents data collected for a particular tape and tape drive combination;
      link the read error or the write error to a particular tape or a particular tape drive based on the write margin result;
      designate the particular tape or the particular tape drive linked to the read error or the write error as bad; and
      render a notification of the particular tape or the particular tape drive designated as bad.

2. The system recited in claim 1, wherein the tapes are automatically loaded into the tape drive.

3. The system recited in claim 1, wherein the memory stores processor-executable code to store the read error or the write error within a data store.

4. The system recited in claim 1, wherein the memory stores processor executable code to link the read error or the write error to the particular tape or the particular tape drive by analyzing the read error or the write error.

5. The system recited in claim 1, wherein the memory stores processor executable code to exclude the particular tape or the particular tape drive that is designated as bad.

6. The system recited in claim 1, wherein the system iteratively links errors to a particular tape or a particular tape drive.

7. A method of determining bad tapes or tape drives, the method comprising:
   obtaining tape and tape drive combinations within a system;
   detecting a read error or a write error that occurs with each tape and tape drive combination, wherein data comprises read errors and write errors for the tape and tape drive combinations, wherein a data point represents the data collected for each tape and tape drive combination; and
   analyzing the read error, the write error, or a parameter to determine a particular tape or a particular tape drive that is bad, wherein the analysis of the read error, the write error, or the parameter includes statistically determining a write margin result by applying a logarithmic weighting calculation to the age of data and the amount of data;

linking the read error, the write error, or the parameter to the particular tape or the particular tape drive that is bad using the write margin result; and notifying a user of the particular tape or the particular tape drive that is bad, in response to a confidence parameter verifying that data used to link the read error or the write error to the particular tape or tape drive is valid.

8. The method recited in claim 7, wherein a data store is updated each time a tape is loaded or unloaded from the system, or each time the particular tape or the particular tape drive is determined to be bad.

9. The method recited in claim 7, wherein the particular tape or the particular tape drive that is bad is excluded from analysis.

10. The method recited in claim 7, wherein a confidence parameter is calculated based on the number of data points.

11. The method recited in claim 7, wherein the method is iteratively performed to determine bad tapes or tape drives.

12. A non-transitory, computer-readable medium, comprising code to direct a processor to:

obtain tape and tape drive combinations within a system;

detect a read error or a write error that occurs with each tape and tape drive combination, wherein a data point represents the data collected for a particular tape and tape drive combination, wherein data includes read errors and write errors for the tape and tape drive combinations; and analyze the read error, the write error, or a parameter to determine the particular tape or the particular tape drive that is bad, wherein the analysis of the read error, the write error, or the parameter includes statistically determining a write margin result by applying a logarithmic weighting calculation to the age of data and the amount of data;

link the particular tape or the particular tape drive that is bad to the read error, the write error, or the parameter using the write margin result; and notify a user of the particular tape or the particular tape drive that is bad in response to a confidence parameter verifying that data used to link the read error or the write error to a particular tape or tape drive is valid.

13. The non-transitory, computer-readable medium recited in claim 12, wherein the non-transitory, computer-readable medium comprises code to direct a processor to update a data store each time a tape is loaded or unloaded from the system, or each time the particular tape or the particular tape drive is determined to be bad.

14. The non-transitory, computer-readable medium recited in claim 12, wherein the non-transitory, computer-readable medium comprises code to direct a processor to exclude the particular tape or the particular tape drive that is bad from analysis.

15. The non-transitory, computer-readable medium recited in claim 12, wherein the non-transitory, computer-readable medium comprises code to direct a processor to iteratively to determine bad tapes or tape drives.

\* \* \* \* \*